(12) United States Patent
Gioia

(10) Patent No.: US 6,290,174 B1
(45) Date of Patent: Sep. 18, 2001

(54) AMPHIBIOUS AIRCRAFT WITH AERODYNAMIC/HYDRODYNAMIC SPONSONS

(76) Inventor: G. Leonard Gioia, 255 Fortenberry Rd., A-1, Merritt Island, FL (US) 32952

( * ) Notice: Subject to any disclaimer, the term of this patent is extended or adjusted under 35 U.S.C. 154(b) by 0 days.

(21) Appl. No.: 09/383,414

(22) Filed: Aug. 26, 1999

Related U.S. Application Data

(60) Provisional application No. 60/098,199, filed on Aug. 27, 1998.

(51) Int. Cl.[7] .................................................. B64C 35/00
(52) U.S. Cl. ............................................................. 244/105
(58) Field of Search ..................... 244/101–106; 116/272, 274, 288; 180/117

(56) References Cited

U.S. PATENT DOCUMENTS

| | | | | |
|---|---|---|---|---|
| 1,273,549 | * | 7/1918 | Sloper | 244/101 |
| 3,190,587 | * | 6/1965 | Fries | 244/106 |
| 4,660,670 | * | 4/1987 | Mattox | 180/117 |
| 4,691,881 | | 9/1987 | Gioia | 244/106 |

FOREIGN PATENT DOCUMENTS

| | | | |
|---|---|---|---|
| 517775 | 2/1940 | (GB) | 244/105 |
| 668127 | 3/1952 | (GB) | 244/105 |

* cited by examiner

Primary Examiner—Charles T. Jordan
Assistant Examiner—George L. Steele
(74) Attorney, Agent, or Firm—Browdy and Neimark

(57) ABSTRACT

A hydrodynamic/aerodynamic amphibious aircraft (1) has a fuselage (10) with sponsons (100) extending outwardly and downwardly on either side of the underbelly (5) to define an inverted channel (15) having a substantially constant cross section. Each sponson has a forward portion (110) fixed to the fuselage and a movable aft portion (120). The aft portion tapers smoothly to a trailing edge (122). When the aft portion is in the flight position the forward and aft portions form a smooth low-drag symmetrical airfoil aerodynamic shape. When the aft portion is raised a hydrodynamic step (112) is left on a lower surface of the forward portion, which turns each of the forward portions into a planing hull.

22 Claims, 3 Drawing Sheets

AMPHIBIOUS AIRCRAFT WITH AERODYNAMIC/HYDRODYNAMIC SPONSONS

CROSS REFERENCE TO RELATED APPLICATION

The present application claims the benefit of U.S. Provisional application number 60/098,199, filed Aug. 27, 1998.

FIELD OF THE INVENTION

The present invention relates to amphibious aircraft with sponsons (hull projections or pontoons).

REVIEW OF THE RELATED TECHNOLOGY

U.S. Pat. No. 4,691,881 discloses an amphibious airplane with sponsons which, together with the underbelly of the fuselage form an inverted channel of constant cross section. Toward the aft end of the plane the sponsons flatten and, at the rear, terminate in a trailing edge (labeled 42; best seen in FIG. 11). While the plane floats the sponsons provide buoyancy. During taxiing, landing, or takeoff the sponsons act as a hull, with the trailing edge 42 acting as the rear edge of a planing hull, that is, acting as a hydrodynamic step.

As is well-known, the use of a planing hull reduces the hydrodynamic hull drag at higher speeds because there is no trailing hull portion to generate negative pressure. All the pressure is upward, so the hull rides higher and has less resistance. This effect depends on the rear or after portion of the hull being essentially flat near the trailing edge. If the surface curves up, a low-pressure region is created; this is the slower "displacement" hull shape. If it curves down, extra work goes into diverting the water stream and there is excess churning of the water, which creates drag.

In a boat hull the hydrodynamic step is often formed by two surfaces meeting at approximately right angles: these surfaces are the transom, which is almost vertical, and the planing-surface bottom of the hull, which is generally horizontal. In an airplane a vertical rear surface must be avoided because aerodynamic resistance (which is negligible in a boat) is just as important as hydrodynamic resistance.

A sponson not only acts as a planing hydrofoil, but also provides buoyancy and lateral stability when the plane is at rest. Therefore, a sponson must be fairly thick. This means that the rear end of the sponson has at least one curve converging to the trailing edge.

The trailing edge 42 of the sponson disclosed in U.S. '881 is formed by upper and lower sponson surfaces meeting at an acute angle (FIG. 11), which lowers the air resistance as compared to a flat rear sponson surface. The lower surface, acts as a hydrofoil must be relatively flat. The upper surface of the sponson therefore must curve downward to meet the trailing edge 42.

As a result, the air path over the upper surface is longer than over the lower surface, and the overall shape of the sponson is like that of an airfoil, i.e. like a wing. The additional lift is minimal—the sponson is much shorter laterally than is a wing—but it still creates appreciable drag.

It would be aerodynamically more efficient if the trailing edge of a sponson were formed by upper and lower surfaces which both curved, resulting in a zero-lift shape, which is aerodynamically the most efficient. (A "zero-lift shape" only has essentially zero lift when disposed at a "zero angle of attack", i.e. it is aligned to the airstream instead of tilted. Even a flat board will generate lift when tilted in an air stream.) However, a zero-lift shape is impossible to combine with the flat rear lower surface of a planing hydrofoil because the upper surface must be longer, which will generate lift according to Bernoulli's principle.

SUMMARY OF THE INVENTION

Accordingly, the present invention has an object, among others, to provide a sponson which combines an aerodynamic configuration with a planing hydrodynamic configuration.

The amphibious aircraft of the invention has two sponsons, one of each of the port and starboard sides, which extend vertically below the underbelly of the main part of the fuselage and extend laterally or outwardly to the sides. The two sponsons thus define an inverted channel which runs under the fuselage with a relatively constant cross-sectional shape.

Each sponson includes two portions, a forward portion and an aft portion, on either side of a separation line. The separation line is preferably at the vertically thickest part of the sponson.

The forward portion is fixed to the main body of the fuselage and includes a lower surface which preferably slopes downward toward the rear and then levels off, relative to the longitudinal axis of the airplane, and becomes generally flat as it approaches the separation line. This generally flat surface is the planing surface when the airplane is moving in contact with the water.

The aft portion of the sponson is movable. In a lowered or flight position it forms with the forward portion a smooth, aerodynamic shape which preferably has essentially zero lift when the angle of attack is zero, i.e. it is not tilted relative to the air stream. From the thickest central part of the sponson the upper and lower surfaces of the aft portion converge to a trailing edge which is located approximately at the level of the middle of the sponson. This location provides a substantially zero-lift shape (at zero angle of attack) and therefore low air resistance.

The aft portion of each sponson is movable to a raised or planing position for water landing and takeoff. In this position the lower surface of the aft portion is raised above the surface of the water during planing motion on landing and takeoff, so that planing action is efficient. The aft portion may be lowered to the flight position after the aircraft slows below planing speed, to provide additional buoyancy and lateral stability.

Preferably, the separation line between the forward and aft portions, which runs along the outside of the integrated sponson in the flight position, is the outside of two separation surfaces which enclose the ends of both sponson portions. Preferably the separation surfaces are, at the lower end, generally vertically aligned like the transom of a boat, and, as they rise, curve toward the front. The space between the two separation surfaces form an open-sided inlet air scoop which diverts air down into the space between the water and the bottom of the aft sponson, which otherwise would be a low-pressure area during planing.

The aft portion of each sponson may be made movable by any conventional mechanism, and may be controllable by any conventional manually-operated, automatic, or computer-controlled device.

The air-scoop configuration of the present invention solves a recognized problem of conventional sponsons, which often have a stepped bottom on their sponsons. Formation of a partial vacuum under a sponson, known as "blowing the hull", sucks the airplane down into the water and increases hydrodynamic drag and wave impact.

Another prior-art problem solved by the present invention is that of aligning the center of buoyancy and the center of gravity. The aft portions of the sponsons can be lifted to any desired height relative to the water line to adjust the buoyancy. Also, the fact that the rear undersurface of the aft sponson portions can curve up increase the range of possible sponson designs, and permits the center of buoyancy to be moved forward or aft for the configuration in which the aft portion is aligned with the forward portion of the sponson.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Here, and in the following claims:

"..." means ..., or any other means for ... ing. Functional expressions in the instant specification and claims define and cover whatever feature or structure is capable of carrying out that function, whether now or in the future, and are to be broadly interpreted.

Figure 1:
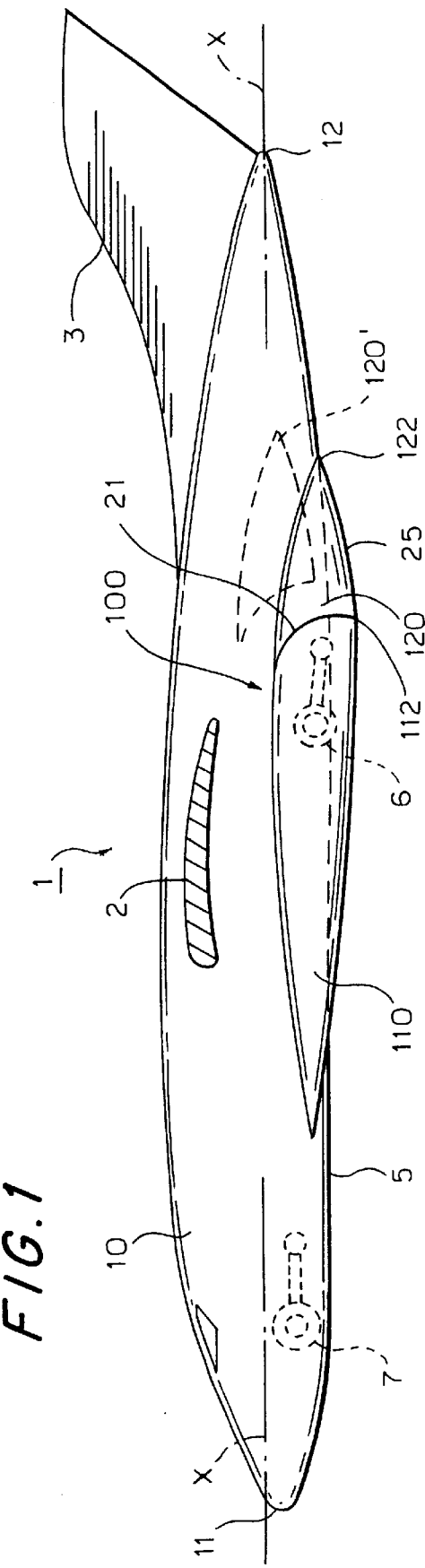
FIG. 1 is a side elevational, partially hidden, view of the invention with the sponson aft portion depicted in planing position by dashed lines.

FIG. 1 shows a preferred embodiment of the aircraft 1 of the present invention, an executive or business-type airplane having a fuselage (or, hull) 10 having a longitudinal axis X. The preferred shape of the fuselage is best seen from FIGS. 2 and 3, which include station lines (edges of sections transverse to the length of the plane, line map contours). The fuselage 10 has a front (forward) end 11 and a rear (aft or after) end 12, and a lower surface or underbelly 5. FIG. 1 also shows conventional airplane parts including a wing 2 (shown in cross section in FIG. 1), tail fin 3, a nose wheel 7, and main wheels 6 (shown, by dashed lines, in retracted position).

For landing on or taking off from water, without the use of the wheels 6 and 7, the airplane 1 includes sponsons 100 that project from the fuselage 10. These act as planing hulls on landing or takeoff, as will be described below. They can act as displacement-hull outriggers when the airplane 1 travels through the water at low speeds (below planing speed). They also act as buoyant pontoons when the airplane 1 is at rest or at low speed to increase stability. The main wheels 6 are preferably retractably stored inside the each sponson 100.

The sponson 100 includes a forward portion 110 and an aft portion 120, joined at a separation line 21. The two portions are aligned for flight and the sponson 100 has a smooth aerodynamic shape, preferably terminating in a trailing edge 122, and preferably has a zero-lift design when substantially aligned with the airstream. For example, the sponson cross-section on a vertical plane may be symmetrical about a horizontal plane that is parallel to the longitudinal axis X of FIG. 1.

The aft portion 120 of each sponson 100 is movable, in a generally upward direction, for landing and takeoff. FIG. 1 shows the aft portion in its raised position by dashed lines, and labeled as 120'.

Figure 2:
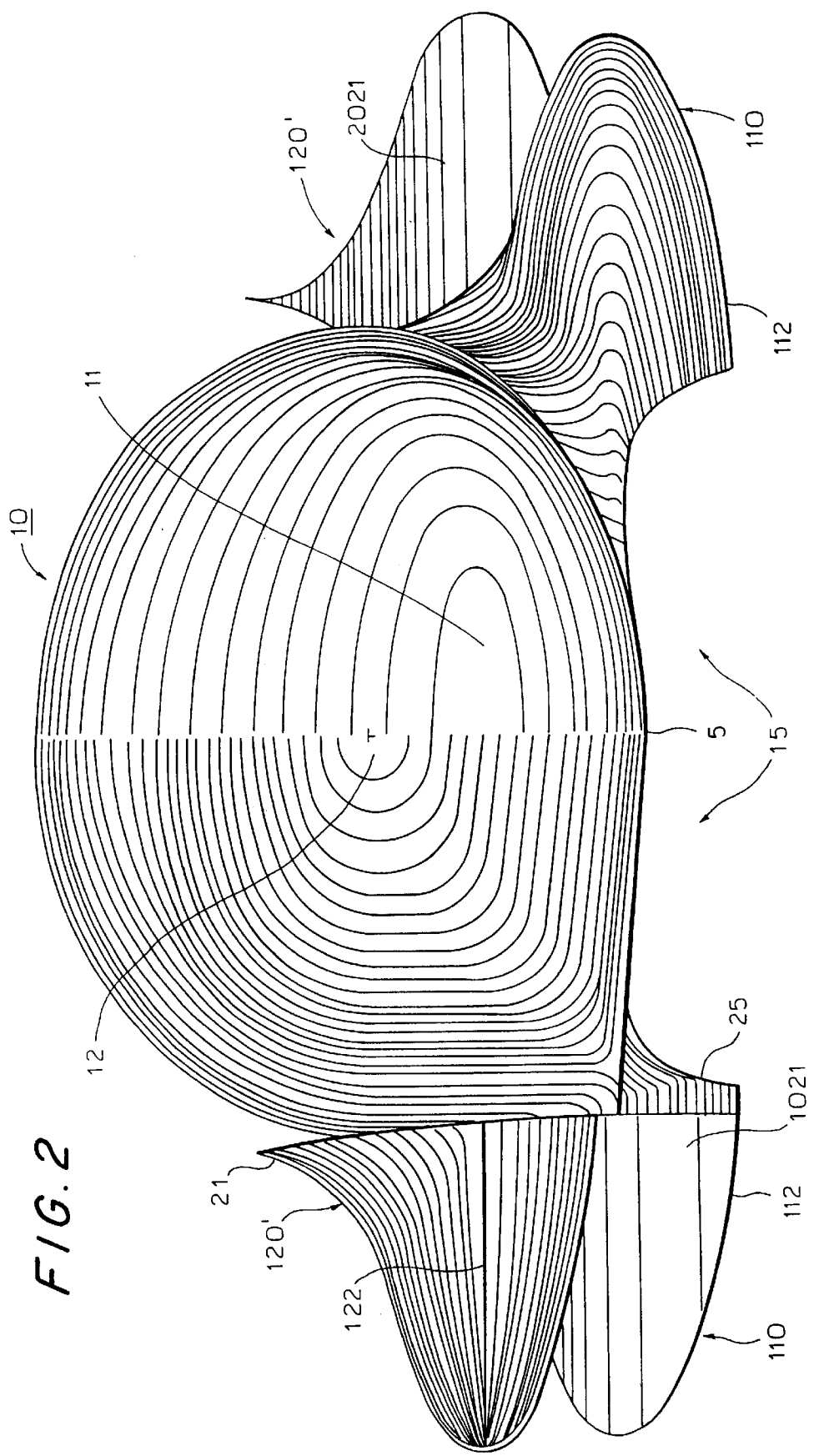
FIG. 2 is combined front/rear elevational view showing fuselage station lines and the sponson aft portion depicted in planing position.

FIG. 2 also shows the aft portion 120' raised to the hydroplaning position for takeoff or landing. The left side of FIG. 2 shows the rear end of the fuselage 10 with the nose 11 and the right side shows the front end of the fuselage 10 with the tail 12. The station or contour lines show the preferred fuselage shapes on the respective sides. The separation line 21 (which encircles the aft portion 120) is also shown in FIG. 2.

In the planing position shown in FIG. 2 the lower part of the forward sponson portion 110 forms a planing hull, with a lower surface terminating in a planing-hull hydrodynamic step 112. The lower surface adjacent the hydrodynamic step 112 preferably is substantially parallel to the fuselage axis X, or else slightly tilted from that orientation clockwise as seen in FIG. 1.

FIG. 1 shows that the separation line 21 is substantially vertical at the hydrodynamic step 112 and curves forward to become tangent or approximately tangent to the upper side of the sponson 100. In the planing position of the aft sponson portion 120 an arcuate gap is formed between the two sponson portions 110, 120.

FIG. 2 shows the preferred construction in which curved, separation surfaces 1021 and 2021 are provided at the rear end of the forward sponson portion 110 and the front end of the aft sponson portion 120, respectively. These surfaces 1021 and 2021 form an air scoop or air deflector in the arcuate gap between the portions 110 and 120. In FIG. 2 the curved shape of the separation surfaces 1021 and 2021 are indicated by section or contour lines, as is the shape of the remainder of the fuselage 10 and sponsons 100.

The separation surfaces 1021 and 2021 preferably are congruent so that they mate when the aft sponson portion 120 is lowered into the flight position, with minimal gap between them.

Figure 3:
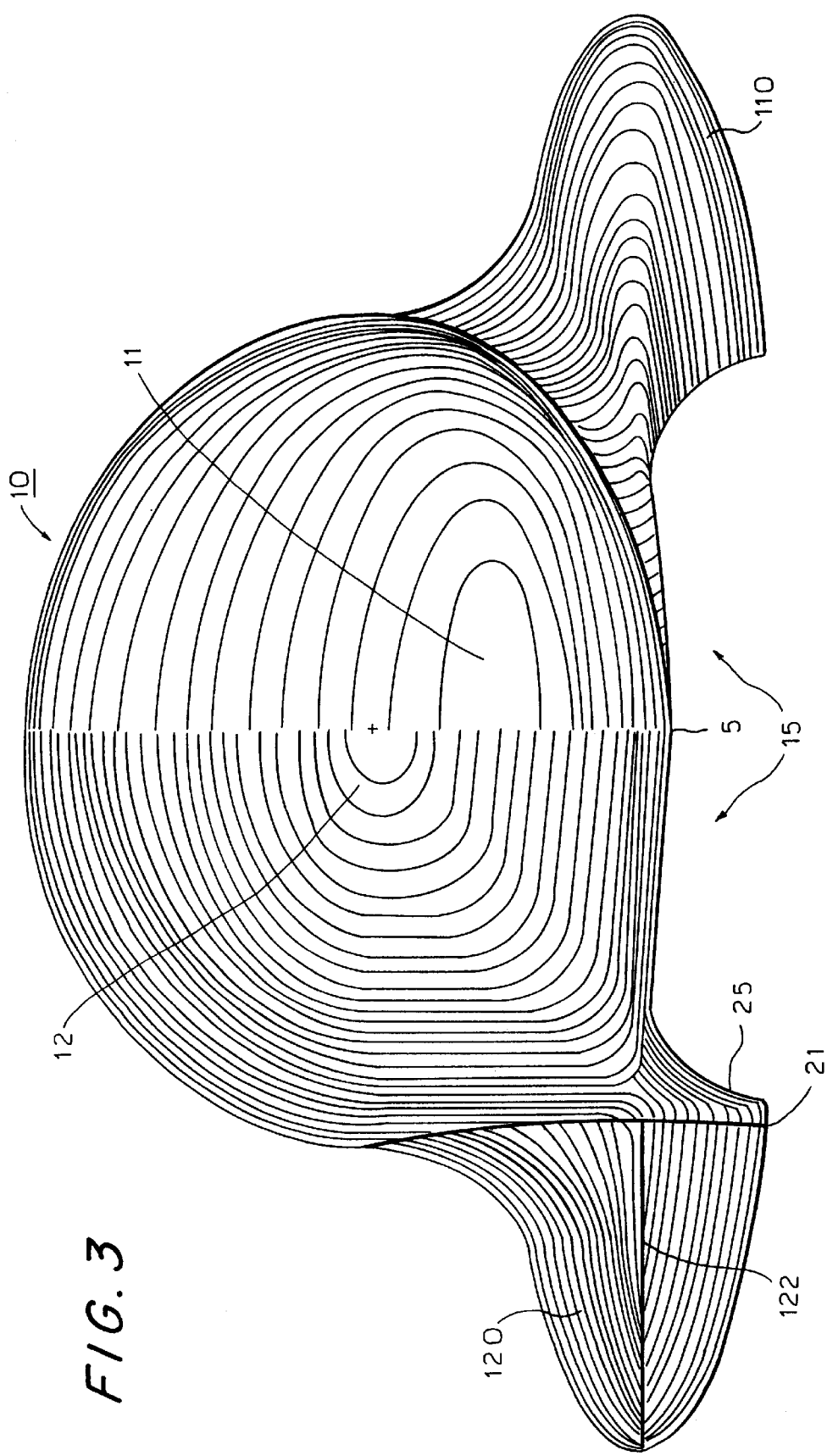
FIG. 3 is combined front/rear elevational view showing fuselage station lines and the sponson aft portion depicted in flight position.

FIG. 3 is like FIG. 2 but shows the aft sponson portions 120 lowered into flight position.

FIGS. 2 and 3 illustrate a feature of the present invention, an inverted channel 15 formed by the fuselage underbelly 5 and the insides of the sponsons 100. In FIG. 1 part of the underbelly 5 is shown behind the sponson 100 in hidden view by dashed line. Preferably the separation line 21 is slightly outboard of the inner surface of the sponson 100 so that a keel 25 is left in place to continue the inverted channel 15 aft of the hydrodynamic step 112 of the forward portion 110 of the sponson 100. The inverted channel 15 improves the planing efficiency by trapping the air stream under the fuselage 10. The cross section of the channel 15 is preferably substantially constant along the axis X of the fuselage 10.

Figure 4:
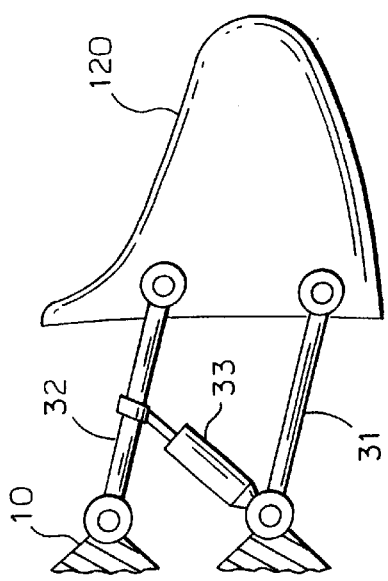
FIG. 4 shows an exemplary mechanism for moving the aft sponson portion.

FIG. 4 shows an exemplary apparatus for moving the sponson aft portion 120, including arms 31, 32 pivoted to the fuselage and an actuator/damper 33. Any means for moving the aft portion 120, i.e. any mechanism whatsoever, is within the scope of the invention. Such means may include, but is not limited to, slides, screws, hydraulic or pneumatic cylinders, linkages, etc.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention. Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A sponson (100) for an aircraft fuselage (10), the sponson comprising:
    a forward portion (110) of the sponson fixed relative to the fuselage, said forward portion having a fixed shape; and
    an aft portion (120) of the sponson, said aft portion having a fixed shape and being movable between
    a flight position, wherein the forward portion and the aft portion form a single aerodynamic shape and the aft portion tapers smoothly to a sponson trailing edge (122), and
    a planing position, wherein the aft portion is raised to leave a hydrodynamic step (112) on a lower surface of the forward portion;
    whereby the sponson is selectively aerodynamically efficient for flight and hydrodynamically efficient for planing.

2. The sponson according to claim 1, wherein the aerodynamic shape includes an essentially zero-lift shape at an approximately zero angle of attack.

3. The sponson according to claim 1, wherein the aerodynamic shape includes an upwardly-curving sponson rear undersurface.

4. The sponson according to claim 1, wherein the forward portion and the aft portion define an arcuate gap therebetween when the aft portion is in the planing position, whereby the arcuate gap forms an air scoop deflecting air downward behind the hydrodynamic step (112), which effectively relieves the low pressure area behind the hydrodynamic step.

5. The sponson according to claim 4, wherein the arcuate gap defines a curved separation line (21) when the aft portion is in the flight position.

6. The sponson according to claim 1, comprising a mechanism for moving the aft portion between the flight position and the planing position.

7. A hydrodynamic/aerodynamic convertible aircraft fuselage (10) of the type including a fuselage underbelly (5) and sponsons (100) extending outwardly and downwardly on either side of the underbelly to define an inverted channel (15) having a substantially constant cross section;
    the improvement wherein:
        a forward portion (110) of each sponson is fixed relative to the fuselage; and
        an aft portion (120) of each sponson is movable between
        a flight position, wherein the forward portion and the aft portion form a single aerodynamic shape and the aft portion tapers smoothly to a sponson trailing edge (122), and
        a planing position, wherein the aft portion is raised to leave a hydrodynamic step (112) on a lower surface of the forward portion;
        whereby the fuselage is selectively aerodynamically efficient for flight and hydrodynamically efficient for planing.

8. The improvement according to claim 7, wherein the aerodynamic shape includes an essentially zero-lift shape at an approximately zero angle of attack.

9. The improvement according to claim 7, wherein the aerodynamic shape includes an upwardly-curving sponson rear undersurface.

10. The improvement according to claim 7, wherein the forward portion and the aft portion define an arcuate gap therebetween when the aft portion is in the planing position, whereby the arcuate gap comprises an air scoop deflecting air downward adjacent the hydrodynamic step (112).

11. The improvement according to claim 10, wherein the arcuate gap defines a curved separation line (21) when the aft portion is in the flight position.

12. The improvement according to claim 7, comprising a mechanism for moving the aft portion between the flight position and the planing position.

13. The improvement according to claim 7, wherein the trailing edge of the aft sponson is substantially aligned with the underbelly in the flight position.

14. The improvement according to claim 7, comprising twin keels extending fore to aft on the underside of the fuselage, inner surfaces of the two keels comprising extensions of the walls of the inverted channel.

15. A sponson (100) for an aircraft fuselage (10), the sponson comprising:
    a forward portion (110) of the sponson fixed relative to the fuselage;
    an aft portion (120) of the sponson; and
    a mechanism coupled to said aft portion for moving said aft portion vertically as a unit between
    a flight position, wherein the forward portion and the aft portion form a single aerodynamic shape and the aft portion tapers smoothly to a sponson trailing edge (122), and
    a planing position, wherein the aft portion is raised to leave a hydrodynamic step (112) on a lower surface of the forward portion;
    whereby the sponson is selectively aerodynamically efficient for flight and hydrodynamically efficient for planing.

16. A hydrodynamic/aerodynamic convertible aircraft fuselage (10) of the type including a fuselage underbelly (5) and sponsons (100) extending outwardly and downwardly on either side of the underbelly to define an inverted channel (15) having a substantially constant cross section;
    the improvement wherein:
        a forward portion (110) of each sponson is fixed relative to the fuselage; and
        an aft portion (120) of each sponson is movable vertically as a unit between
        a flight position, wherein the forward portion and the aft portion form a single aerodynamic shape and the aft portion tapers smoothly to a sponson trailing edge (122), and
        a planing position, wherein the aft portion is raised to leave a hydrodynamic step (112) on a lower surface of the forward portion;

whereby the fuselage is selectively aerodynamically efficient for flight and hydrodynamically efficient for planing.

17. The improvement according to claim 16, further comprising a mechanism coupled to said aft portion to move said aft portion between the flight position and the planing position.

18. The improvement according to claim 16, wherein each of said portions of each said sponson is of fixed shape.

19. The improvement according to claim 15, wherein each of said portions of each said sponson is of fixed shape.

20. The improvement according to claim 7, further comprising a mechanism coupled to said aft portion to move said aft portion between the flight position and the planing position.

21. The improvement according to claim 20, wherein each of said portions of each said sponson is of fixed shape.

22. The improvement according to claim 7, wherein each of said portions of each said sponson is of fixed shape.

* * * * *